US012618956B2

(12) United States Patent
Wakita et al.

(10) Patent No.: US 12,618,956 B2
(45) Date of Patent: May 5, 2026

(54) OBJECT DETECTION DEVICE AND OBJECT DETECTION METHOD

(71) Applicant: AISIN CORPORATION, Aichi (JP)

(72) Inventors: Kosuke Wakita, Kariya (JP); Ippei Sugae, Kariya (JP)

(73) Assignee: AISIN CORPORATION, Kariya (JP)

( * ) Notice: Subject to any disclaimer, the term of this patent is extended or adjusted under 35 U.S.C. 154(b) by 251 days.

(21) Appl. No.: 18/289,802

(22) PCT Filed: Jun. 24, 2022

(86) PCT No.: PCT/JP2022/025402
§ 371 (c)(1),
(2) Date: Jul. 8, 2024

(87) PCT Pub. No.: WO2023/282098
PCT Pub. Date: Jan. 12, 2023

(65) Prior Publication Data
US 2024/0385303 A1 Nov. 21, 2024

(30) Foreign Application Priority Data
Jul. 9, 2021 (JP) ................................. 2021-114123

(51) Int. Cl.
*G01S 7/539* (2006.01)
*G01S 15/08* (2006.01)

(52) U.S. Cl.
CPC .............. *G01S 7/539* (2013.01); *G01S 15/08* (2013.01)

(58) Field of Classification Search
CPC .................................. G01S 7/539; G01S 15/08
(Continued)

(56) References Cited

U.S. PATENT DOCUMENTS

| | | | |
|---|---|---|---|
| 2010/0302069 A1* | 12/2010 | Frank | G01S 15/931 |
| | | | 340/932.2 |
| 2016/0069990 A1* | 3/2016 | Harada | G01S 15/42 |
| | | | 367/98 |

(Continued)

FOREIGN PATENT DOCUMENTS

| | | |
|---|---|---|
| DE | 10 2018 216 790 A1 | 4/2020 |
| JP | 2014-215283 A | 11/2014 |

(Continued)

OTHER PUBLICATIONS

International Search Report for PCT/JP2022/025402 dated Aug. 2, 2022 (PCT/ISA/210).

*Primary Examiner* — Kerri L McNally
(74) *Attorney, Agent, or Firm* — Sughrue Mion, PLLC

(57) ABSTRACT

An object detection device includes an acquisition unit that acquires, a plurality of times at different predetermined timings, an object distance that is a distance from a transmission and reception unit mounted on a vehicle to an object, the object distance being detected on the basis of a result of transmission of a transmission wave by the transmission and reception unit and reception of a reflected wave from the object by the transmission and reception unit, and acquires a travel distance of the vehicle that travels while the object distances are acquired the plurality of times, and a determination unit that determines a height of the object on the basis of a plurality of the object distances and the travel distance that are acquired by the acquisition unit.

5 Claims, 5 Drawing Sheets

(58) Field of Classification Search
USPC ...................................................... 340/943.3
See application file for complete search history.

(56) References Cited

U.S. PATENT DOCUMENTS

2020/0096633 A1* 3/2020 Matsuura ................ G01S 7/539
2022/0035029 A1* 2/2022 Wang ................... G01S 15/876

FOREIGN PATENT DOCUMENTS

JP          2015-105915 A      6/2015
JP          2018-204964 A      12/2018
WO          2012/140769 A1     10/2012

* cited by examiner

21A(21)
21B(21)
21C(21)
21D(21)

21E(21)
21F(21)
21G(21)
21H(21)

OBJECT DETECTION DEVICE AND OBJECT DETECTION METHOD

CROSS REFERENCE TO RELATED APPLICATIONS

This application is a National Stage of International Application No. PCT/JP2022/025402, filed Jun. 24, 2022, claiming priority to Japanese Patent Application No. 2021-114123, filed Jul. 9, 2021, the entire contents of which are incorporated in their entirety.

TECHNICAL FIELD

The present disclosure relates to an object detection device and an object detection method.

BACKGROUND ART

Conventionally, there has been studied a technique for determining a height of an object present around a vehicle. As such a technique, for example, a technique is known in which a plurality of ultrasonic sensors are installed at different height positions of a vehicle or different front and rear positions of the vehicle, and ultrasonic waves are transmitted and received by the plurality of ultrasonic sensors to determine a height of an object.

CITATIONS LIST

Patent Literature

Patent Literature 1: JP 2015-105915 A
Patent Literature 2: JP 2014-215283 A
Patent Literature 3: JP 2018-204964 A

SUMMARY OF THE DISCLOSURE

Technical Problems

However, a conventional technique as described above requires installation of a plurality of ultrasonic sensors at different height positions of the vehicle or different front and rear positions of the vehicle, and thus a degree of freedom in designing the vehicle may be limited.

Accordingly, one of aims of the present disclosure is to obtain an object detection device and an object detection method that allow determination of a height of an object without decreasing a degree of freedom in designing a vehicle.

Solutions to Problems

An object detection device as an example of the present disclosure includes an acquisition unit that acquires, a plurality of times at different predetermined timings, an object distance that is a distance from a transmission and reception unit mounted on a vehicle to an object, the object distance being detected on the basis of a result of transmission of a transmission wave by the transmission and reception unit and reception of a reflected wave from the object by the transmission and reception unit, and acquires a travel distance of the vehicle that travels while the object distances are acquired the plurality of times, and a determination unit that determines a height of the object on the basis of a plurality of the object distances and the travel distance that are acquired by the acquisition unit.

According to such a configuration, the height of the object can be determined on the basis of the object distances and the travel distance, regardless of a position of the transmission and reception unit. Therefore, the height of the object can be determined without impairing a degree of freedom in designing a vehicle.

In the object detection device, for example, in a case where an absolute value of a difference between an absolute value of a difference between the object distance at a predetermined number of times among the plurality of times and the object distance at a time subsequent to the predetermined number of times among the plurality of times, and the travel distance from the predetermined number of times to the time subsequent to the predetermined number of times is equal to or less than a threshold value, it is determined that the height of the object is equal to or more than a height at which the transmission and reception unit is attached.

According to such a configuration, for example, an object having a height equal to or more than the height at which the transmission and reception unit is attached can be detected.

In the object detection device, for example, in a case where an absolute value of a difference between an absolute value of a difference between a length of an adjacent side of a first right triangle in which a length of a hypotenuse is the object distance at a predetermined number of times among the plurality of times and a length of an opposite side is a height at which the transmission and reception unit is attached, and a length of an adjacent side of a second right triangle in which a length of a hypotenuse is the object distance at a time subsequent to the predetermined number of times among the plurality of times and a length of an opposite side is a height at which the transmission and reception unit is attached, and the travel distance from the predetermined number of times to the time subsequent to the predetermined number of times is equal to or less than a threshold value, the determination unit determines that the height of the object is less than the height at which the transmission and reception unit is attached.

According to such a configuration, for example, an object having a height less than the height at which the transmission and reception unit is attached can be detected.

In the object detection device, for example, in a case where an absolute value of a difference between an absolute value of a difference between a length of an adjacent side of the first right triangle and a length of an adjacent side of the second right triangle, and the travel distance is equal to or greater than a threshold value, the determination unit does not determine the height of the object.

The object detection device includes, for example, a plurality of the transmission and reception units at different positions in a width direction of the vehicle.

According to such a configuration, for example, the height of the object can be determined for each of the plurality of transmission and reception units arranged in the width direction of the vehicle. Therefore, the height of the object positioned in a relatively wide range around the vehicle can be determined.

An object detection method as an example of the present disclosure is an object detection method executed by an object detection device, the object detection method including a step of acquiring, a plurality of times at different predetermined timings, an object distance that is a distance from a transmission and reception unit mounted on a vehicle to an object, the object distance being detected on the basis of a result of transmission of a transmission wave by the transmission and reception unit and reception of a reflected wave from the object by the transmission and reception unit, and acquiring a travel distance of the vehicle that travels while the object distances are acquired the plurality of times, and a step of determining a height of the object on the basis of a plurality of the object distances and the travel distance acquired.

According to such a configuration, the height of the object can be determined on the basis of the object distances and the travel distance, regardless of a position of the transmission and reception unit. Therefore, the height of the object can be determined without impairing a degree of freedom in designing a vehicle.

DESCRIPTION OF EMBODIMENTS

Hereinafter, an embodiment of the present disclosure will be described with reference to the drawings. The configurations of the embodiment described below and functions and effects brought about by the configurations are merely an example, and the present disclosure is not limited to the following description.

Figure 1:
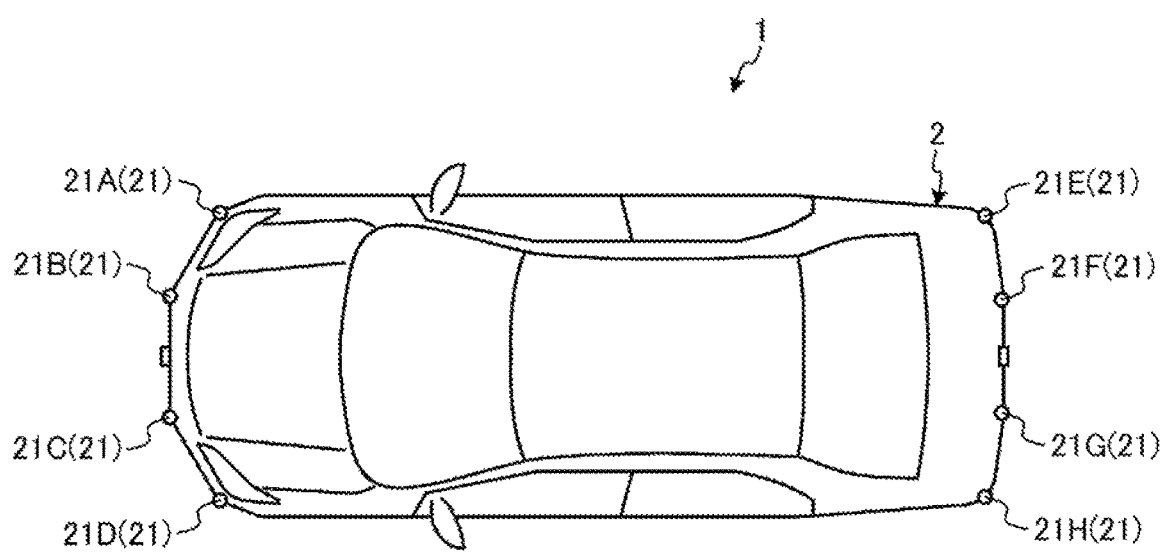
FIG. 1 is a top view showing an example of a configuration of a vehicle according to an embodiment.

FIG. 1 is a top view showing an example of a configuration of a vehicle 1 according to an embodiment. The vehicle 1 is an example of a vehicle on which an object detection device according to the present embodiment is mounted. The object detection device according to the present embodiment is a device that detects an object present around the vehicle 1, on the basis of time of flight (TOF), Doppler shift information, or the like acquired by transmitting an ultrasonic wave from the vehicle 1 and receiving a reflected wave from the object.

The object detection device according to the present embodiment includes a plurality of transmission and reception units 21A to 21H (hereinafter, abbreviated as a transmission and reception unit 21 in a case where it is not necessary to distinguish the plurality of transmission and reception units 21A to 21H). Each of the transmission and reception units 21 is installed on a vehicle body 2 as an exterior of the vehicle 1, transmits an ultrasonic wave (transmission wave) toward outside of the vehicle body 2, and receives a reflected wave from an object present outside the vehicle body 2. In the example shown in FIG. 1, a plurality of (four as an example) transmission and reception units 21A to 21D are disposed at a front-end portion of the vehicle body 2, and a plurality of (four as an example) transmission and reception units 21E to 21H are disposed at a rear-end portion. The plurality of transmission and reception units 21A to 21D are at different positions in a width direction of the vehicle 1. Further, the plurality of transmission and reception units 21E to 21H are at different positions in a width direction of the vehicle. Note that the number and installation positions of the transmission and reception units 21 are not limited to the above-described example.

Figure 2:
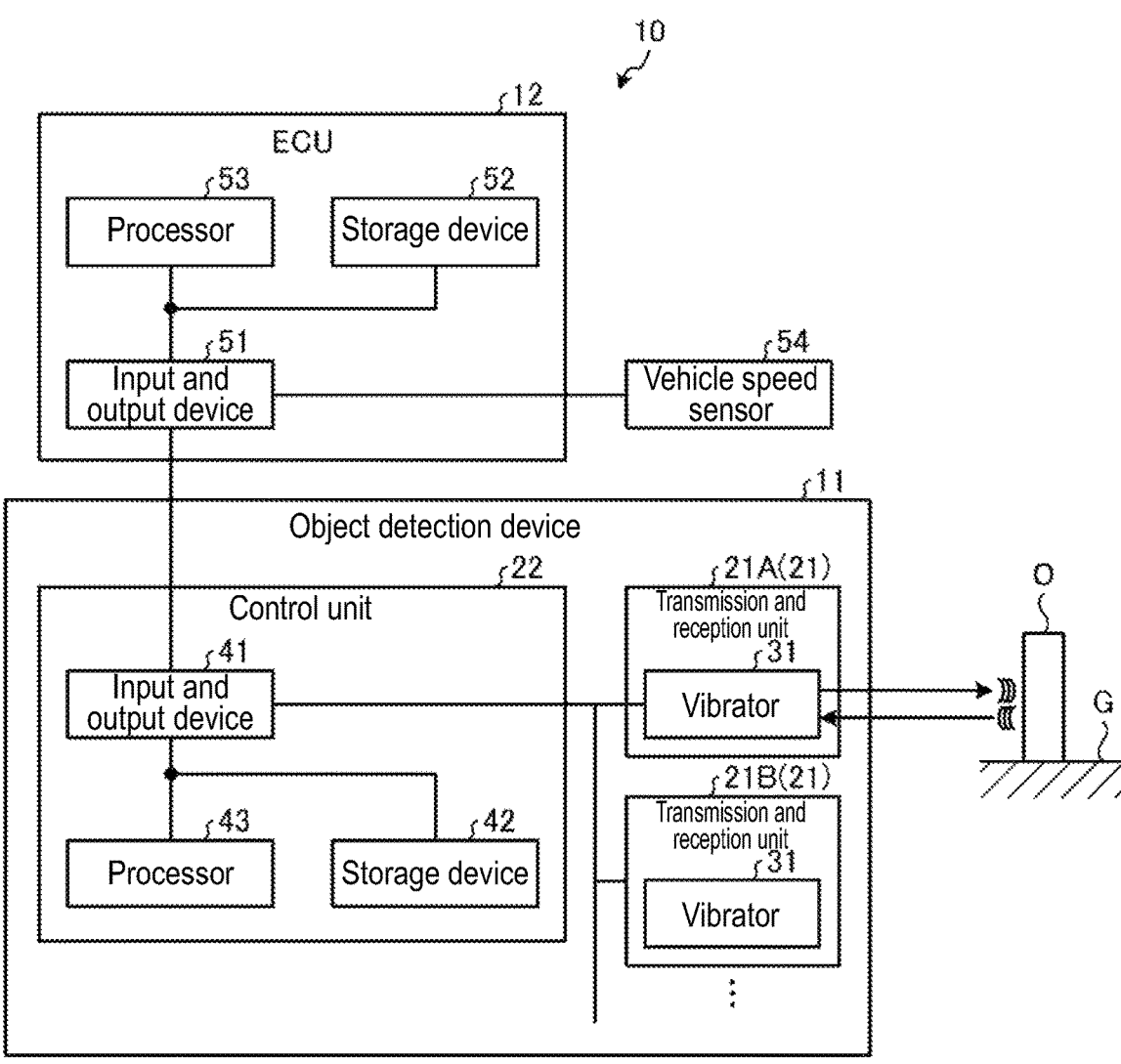
FIG. 2 is a block diagram showing an example of a configuration of a vehicle control device according to the embodiment.

FIG. 2 is a block diagram showing an example of a configuration of a vehicle control device 10 according to the embodiment. The vehicle control device 10 includes an object detection device 11 and an ECU 12. On the basis of information output from the object detection device 11, the vehicle control device 10 performs processing for controlling the vehicle 1.

The object detection device 11 includes the plurality of transmission and reception units 21 and a control unit 22. Each transmission and reception unit 21 includes a vibrator 31 configured utilizing a piezoelectric element or the like, an amplifier, and the like, and achieves transmission and reception of an ultrasonic wave with vibration of the vibrator 31. Specifically, each transmission and reception unit 21 transmits an ultrasonic wave, which is generated in response to vibration of the vibrator 31, as a transmission wave, and detects vibration of the vibrator 31 caused by a reflected wave obtained by the transmission wave being reflected by an object O. The object O includes an object O with which the vehicle 1 should avoid coming into contact and a road surface G on which the vehicle 1 travels. The vibration of the vibrator 31 is converted into an electric signal, and echo information indicating time-course changes in intensity (amplitude) of the reflected wave from an object O can be acquired on the basis of the electric signal. The TOF or the like corresponding to a distance from the transmission and reception units 21 (vehicle body 2) to the object O can be acquired on the basis of the echo information.

The echo information may be generated on the basis of data acquired by one transmission and reception unit 21, or may be generated on the basis of a plurality of pieces of data acquired by each of the plurality of transmission and reception units 21. For example, echo information about an object O present in front of the vehicle body 2 may be generated on the basis of two or more pieces of data (for example, an average value, or the like) acquired by two or more of the four transmission and reception units 21A to 21D disposed in front of the vehicle body 2 (refer to FIG. 1). Similarly, echo information about an object O present behind the vehicle body 2 may be generated on the basis of two or more pieces of data acquired by two or more of the four transmission and reception units 21E to 21H disposed behind the vehicle body 2 (refer to FIG. 1).

Note that, although there is exemplified a configuration in the example shown in FIG. 2 in which both transmission of a transmission wave and reception of a reflected wave are performed utilizing a single vibrator 31, the configuration of the transmission and reception unit 21 is not limited thereto. For example, as in a configuration in which a vibrator for transmitting a transmission wave and a vibrator for receiving a reflected wave are separately provided, a transmission side and a reception side may be separated.

The control unit 22 includes an input and output device 41, a storage device 42, and a processor 43. The input and output device 41 is an interface device for achieving transmission and reception of information between the control unit 22 and outside (the transmission and reception units 21, ECU 12, and the like). The storage device 42 includes a main storage device such as a read only memory (ROM) and a random access memory (RAM), and an auxiliary storage device such as a hard disk drive (HDD) and a solid state drive (SSD). The processor 43 is an integrated circuit that executes various kinds of processing for implementing functions of the control unit 22, and includes, for example, a central processing unit (CPU) that operates according to a program, an application specific integrated circuit (ASIC) designed for a specific application, and the like. The processor 43 executes various arithmetic processing and control processing by reading and executing a program stored in the storage device 42.

The ECU 12 is a unit that executes various kinds of processing for controlling the vehicle 1, on the basis of various kinds of information acquired from the object detection device 11 and the like. The ECU 12 includes an input and output device 51, a storage device 52, and a processor 53. The input and output device 51 is an interface device for achieving transmission and reception of information between the ECU 12 and an external mechanism (the object detection device 11, a vehicle speed sensor 54, a drive mechanism, a braking mechanism, a steering mechanism, a transmission mechanism, an in-vehicle display, a speaker, and the like). The storage device 52 includes a main storage device such as a ROM and a RAM, and an auxiliary storage device such as an HDD and an SSD. The processor 53 is an integrated circuit that executes various kinds of processing for implementing functions of the ECU 12, and includes, for example, a CPU, an ASIC, and the like. The processor 53 executes various arithmetic processing and control processing by reading a program stored in the storage device 52.

The vehicle speed sensor 54 is, for example, a sensor that includes a Hall element provided in vicinity of a wheel of the vehicle 1 and detects a rotation amount of the wheel or a rotation rate of the wheel per unit time. The vehicle speed sensor 54 outputs the number of wheel speed pulses indicating the detected rotation amount or rotation rate as a sensor value for calculating vehicle speed. The ECU 12 can calculate a travel speed (vehicle speed), a travel amount, and the like of the vehicle 1 on the basis of the sensor value acquired from the vehicle speed sensor 54.

Figure 3:
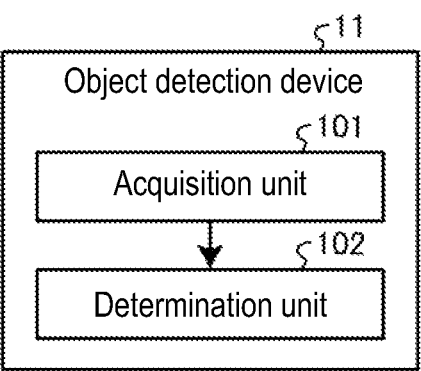
FIG. 3 is a block diagram showing an example of a functional configuration of an object detection device according to the embodiment.

FIG. 3 is a block diagram showing an example of a functional configuration of the object detection device 11 according to the embodiment. The object detection device 11 according to the present embodiment includes an acquisition unit 101 and a determination unit 102. These functional components 101 and 102 are implemented by cooperation of hardware components of the object detection device 11 exemplified in FIG. 2 and software components such as firmware and a program.

The acquisition unit 101 acquires various types of information. For example, the acquisition unit 101 processes data acquired by the transmission and reception unit 21 and generates various kinds of information. The acquisition unit 101 performs, for example, amplification processing, filter processing, envelope line processing, or the like on an electrical signal corresponding to the vibration of the vibrator 31, and generates echo information indicating time-course changes in the intensity (amplitude) of the reflected wave transmitted by a transmission and reception unit 21 and reflected by the object O. On the basis of the echo information, the TOF corresponding to an object O present around the vehicle 1 is detected, and a distance (hereinafter, also referred to as an object distance) from the transmission and reception unit 21 (vehicle body 2) to the object O is calculated, that is, acquired. The acquisition unit 101 acquires an object distance for each transmission and reception, which is transmission of a transmission wave and reception of a reflected wave by the transmission and reception unit 21. That is, the acquisition unit 101 acquires the object distance a plurality of times at different predetermined timings.

Figure 4:
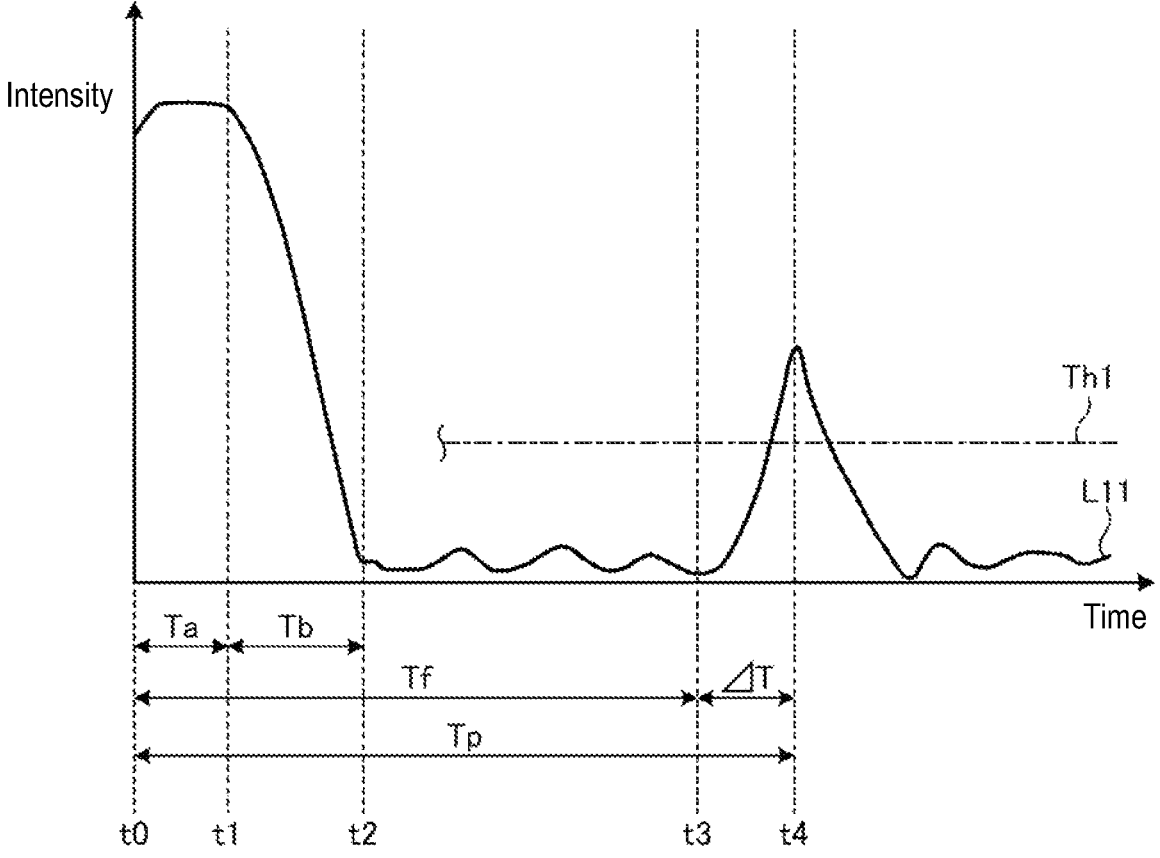
FIG. 4 is a diagram showing an example of echo information at a time of detection of an object in the embodiment.

FIG. 4 is a diagram showing an example of echo information at a time of detecting an object O in the embodiment. FIG. 4 exemplifies an envelope line L11 as echo information indicating time-course changes in intensity of an ultrasonic wave transmitted and received by a transmission and reception unit 21. In the graph shown in FIG. 4, the horizontal axis corresponds to time (TOF), and the vertical axis corresponds to intensity of an ultrasonic wave transmitted and received by the transmission and reception unit 21.

The envelope line L11 indicates time-course changes in intensity indicating magnitude of vibration of the vibrator 31. It can be understood from the envelope line L11 that the vibrator 31 is driven to vibrate from a timing to by a time Ta, by which transmission of the transmission wave is completed at a timing t1, and then the vibration of the vibrator 31 continues while attenuating during a time Tb until a timing t2. Therefore, in the graph shown in FIG. 4, the time Tb corresponds to a so-called reverberation time.

The envelope line L11 reaches a peak at which the magnitude of the vibration of the vibrator 31 becomes equal to or greater than a detection threshold value Th1 at a timing t4 after a lapse of a time Tp from the timing to at which the transmission of the transmission wave is started. The detection threshold value Th1 is a value set to identify whether the vibration of the vibrator 31 is caused by reception of a reflected wave from an object O as a detection target (another vehicle, a structure, a pedestrian, or the like), or caused by reception of a reflected wave from an object other than the object O as a detection target (for example, the road surface G, or the like). Vibration having a peak equal to or greater than the detection threshold value Th1 can be regarded as being caused by reception of the reflected wave from the object O as the detection target.

The envelope line L11 in this example indicates that the vibration of the vibrator 31 attenuates from the timing t4. Therefore, the timing t4 corresponds to a timing at which reception of the reflected wave from the object O is completed, in other words, a timing at which the transmission wave transmitted last at the timing t1 returns as a reflected wave.

Further, in the envelope line L11, a timing t3 as a start point of the peak at timing t4 corresponds to a timing at which reception of the reflected wave from the object O starts, in other words, a timing at which a transmission wave first transmitted at the timing to returns as a reflected wave. Therefore, a time $\Delta T$ between the timing t3 and the timing t4 is equal to the time Ta as a transmission time of the transmission wave.

Thus, in order to obtain a distance from a transmission and reception source of an ultrasonic wave to the object O by utilizing the TOF, it is necessary to obtain a time Tf between the timing t0 at which the transmission wave starts to be transmitted and the timing t3 at which the reflected wave starts to be received. The time Tf can be obtained by subtracting the time $\Delta T$ equal to the time Ta as the transmission time of the transmission wave from the time Tp as a difference between the timing to and the timing t4 at which intensity of the reflected wave reaches a peak, exceeding the detection threshold value Th1.

The timing t0 at which the transmission wave starts to be transmitted can be easily identified as a timing at which the object detection device 11 starts operation, and the time Ta as the transmission time of the transmission wave is predetermined by a setting or the like. Therefore, a distance (object distance) from the transmission and reception source to the object O can be obtained by identifying the timing t4 at which the intensity of the reflected wave reaches the peak, being equal to or greater than the detection threshold value Th1. The acquisition unit 101 calculates the object distance by, for example, the above-described method.

Further, the acquisition unit 101 receives, that is, acquires the travel speed of the vehicle 1 from the ECU 12. Note that the acquisition unit 101 may receive the sensor value of the vehicle speed sensor 54 and calculate the travel speed of the vehicle 1 on the basis of the sensor value.

The determination unit 102 determines a height (hereinafter, also referred to as an object height H2) of the object O on the basis of the plurality of object distances and travel speed of the vehicle 1 that are acquired by the acquisition unit 101. For example, the determination unit 102 determines the height of the object O on the basis of the plurality of object distances acquired by the acquisition unit 101 and the travel distance of the vehicle 1 based on the travel speed of the vehicle 1. For example, the determination unit 102 can determine whether or not the height of the object O is equal to or more than a height at which the transmission and reception unit 21 is attached (hereinafter, also referred to as a transmission and reception unit height H1). Here, each of the height of the object O and the height at which the transmission and reception unit 21 is attached is, for example, a height from the road surface G. That is, the road surface G is a reference of the height of the object O and the height at which the transmission and reception unit 21 is attached. The transmission and reception unit height H1 is a height from the road surface G to a predetermined position of the transmission and reception unit 21 (for example, the center of the vibrator 31, or the like), and is a known value.

Figure 5:
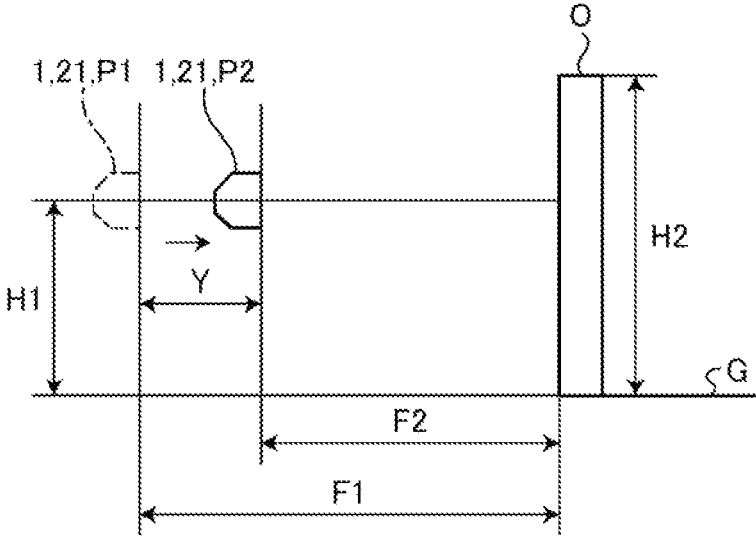
FIG. 5 is a diagram for describing a method for determining a height of an object executed by the object detection device according to the embodiment, and is a diagram in a case where the height of the object is equal to or more than a height at which a transmission and reception unit is attached.

FIG. 5 is a diagram for describing a method for determining a height of the object O executed by the object detection device 11 according to the embodiment, and is a diagram in a case where the height of the object O is equal to or more than the height at which a transmission and reception unit 21 is attached. By using the following method, the determination unit 102 can determine that the height of the object O is equal to or more than the height at which the transmission and reception unit 21 is attached. Here, FIG. 5 shows an example of a case where the vehicle 1 travels so that the transmission and reception unit 21 moves from a position P1 to a position P2, and the transmission and reception unit 21 performs transmission and reception at each of the position P1 and the position P2. That is, the position P1 is a position where the transmission and reception unit 21 has performed a predetermined number of times of transmission and reception, and the position P2 is a position where the transmission and reception unit 21 performs transmission and reception at the time subsequent (next, as an example) to the predetermined number of times. A travel distance Y of the vehicle 1 at this time is a distance between the position P2 and the position P1, and is calculated by a product of the travel speed of the vehicle 1 and a time from the above-described predetermined number of times to the time subsequent to the above-described predetermined number of times. Here, a distance between the transmission and reception unit 21 and the object O at the predetermined number of times, that is, at the position P1, is defined as a distance F1, and a distance between the transmission and reception unit 21 and the object O at the time subsequent to the predetermined number of times, that is, at the position P2, is defined as a distance F2. In a case where an absolute value of a difference between an absolute value of a difference between the distance F1 and the distance F2 and the travel distance Y of the vehicle 1 is equal to or less than a threshold value K, the determination unit 102 determines that the object height H2 is equal to or more than the transmission and reception unit height H1. That is, the determination unit 102 determines that object height H2 is equal to or more than the transmission and reception unit height H1 in a case where the following mathematical formula (1) is satisfied.

$$||(F1 - F2)| - Y| \le K \qquad (1)$$

Here, the threshold value K is "0" as an example. That is, in a case where the absolute value of the difference between the distance F1 and the distance F2 matches the travel distance Y of the vehicle 1, the determination unit 102 determines that the object height H2 is equal to or more than the transmission and reception unit height H1. Note that the threshold value K may be a value greater than "0". For example, the threshold value K may be a maximum value of a difference between variation in the distance F1 and variation in the distance F2 corresponding to variation in TOF, and may be, for example, 2 to 3 [cm]. In other words, in a case where the absolute value of the difference between the absolute value of the difference between the distance F1 and the distance F2 and the travel distance Y of the vehicle 1 is within a predetermined range, the determination unit 102 may determine that the object height H2 is equal to or more than the transmission and reception unit height H1. Note that the threshold value is not limited to the above, and may be set in consideration of, for example, variation in positions at which the transmission and reception units 21 are attached. Further, the time from the above-described predetermined number of times to the time subsequent to the predetermined number of times is also referred to as a detection cycle. Further, the predetermined number of times is also referred to as arbitrary times, reference times, certain times, or the like.

Figure 6:
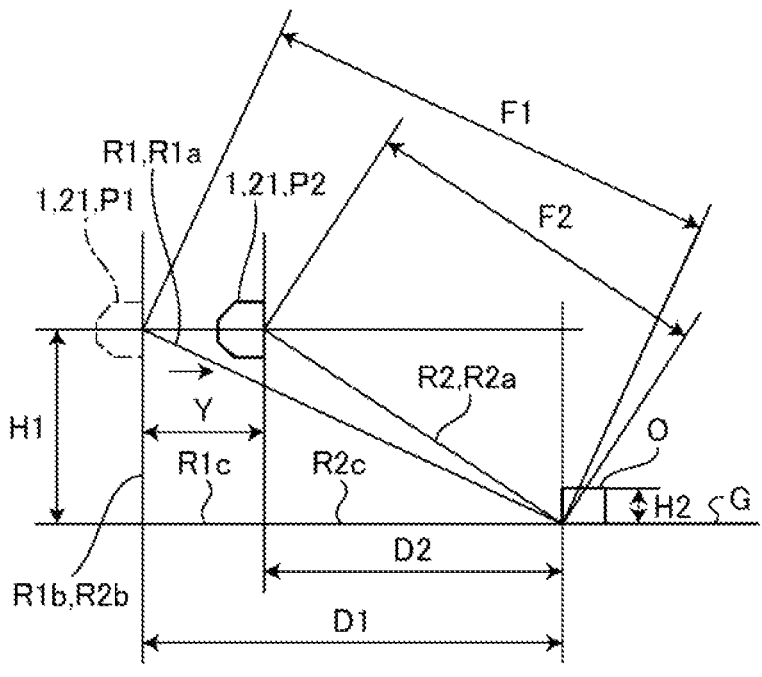
FIG. 6 is a diagram for describing a method for determining a height of the object executed by the object detection device according to the embodiment, and is a diagram in a case where the height of the object is less than the height at which the transmission and reception unit is attached.

FIG. 6 is a diagram for describing a method for determining a height of the object O executed by the object detection device 11 according to the embodiment, and is a diagram in a case where the height of the object O is less than the height at which a transmission and reception unit 21 is attached. By using the following method, the determination unit 102 can determine that the height of the object O is less than the height at which the transmission and reception unit 21 is attached. Here, as in FIG. 5, FIG. 6 shows an example of a case where the vehicle 1 travels so that the transmission and reception unit 21 moves from the position P1 to the position P2, and the transmission and reception unit 21 performs transmission and reception at each of the position P1 and the position P2.

The determination unit 102 creates right triangles R1 and R2 for the positions P1 and P2, respectively, and determines the height of the object O on the basis of the right triangles R1 and R2. The right triangle R1 has a hypotenuse R1a, an opposite side R1b, and an adjacent side R1c, and the right triangle R2 has a hypotenuse R2a, an opposite side R2b, and an adjacent side R2c. The right triangle R1 is an example of a first right triangle, and the right triangle R2 is an example of a second right triangle. The hypotenuses R1a and R2a are sides extending between the transmission and reception unit 21 and the object O at the positions P1 and P2, respectively, and lengths of the hypotenuses R1$a$ and R2$a$ are distances F1 and F2 at the positions P1 and P2, respectively.

The opposite sides R1$b$ and R2$b$ are sides extending from the road surface G to the transmission and reception unit 21, and a length of the opposite sides R1$b$ and R2$b$ is the transmission and reception unit height H1.

The adjacent sides R1$c$ and R2$c$ are sides along a travel direction of the vehicle 1, and are along the road surface G. Lengths D1 and D2 of the adjacent sides R1$c$ and R2$c$, respectively, are expressed by the following mathematical formulas (2) and (3).

$$D1 = \sqrt{\left((F1)^2 - (H1)^2\right)} \qquad (2)$$

$$D2 = \sqrt{\left((F2)^2 - (H1)^2\right)} \qquad (3)$$

In a case where an absolute value of a difference between an absolute value of a difference between the length D1 of the adjacent side R1$c$ and the length D2 of the adjacent side R2$c$, and the travel distance of the vehicle 1 from the predetermined number of times to the time subsequent to the predetermined number of times, the travel distance being calculated on the basis of the travel speed of the vehicle 1, is equal to or less than a threshold value, the determination unit 102 determines that the object height H2 is less than the transmission and reception unit height H1. That is, the determination unit 102 determines that object height H2 is less than the transmission and reception unit height H1 in a case where the following mathematical formula (4) is satisfied.

$$\|(D1 - D2)|-Y| \leq K \qquad (4)$$

Note that an object O having an object height H2 less than the transmission and reception unit height H1 is also referred to as a low object or a low step. Further, an object O is also referred to as an obstacle. Further, in a case where the detection target (determination target, stationary target) object O is a wall, there may be a case where the reflected wave has a multipath and is reflected on the transmission and reception unit 21 also from a boundary between the object O and the road surface G. However, the above-described processing may be performed assuming that the reflected wave in this case is also a reflected wave from the wall.

Figure 7:
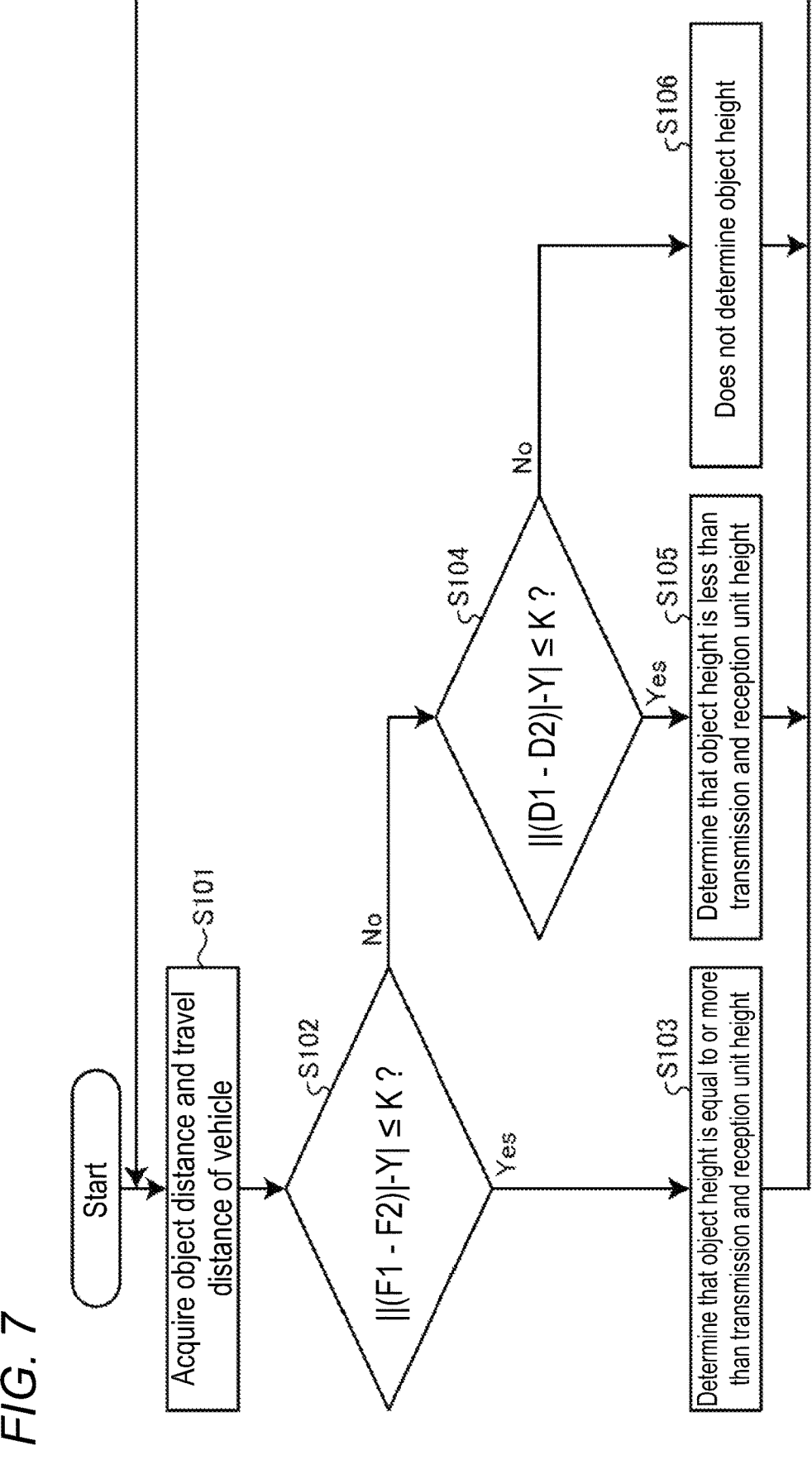
FIG. 7 is a flowchart showing an example of processing (object detection method) executed by the object detection device according to the embodiment.

FIG. 7 is a flowchart showing an example of processing (object detection method) executed by the object detection device 11 according to the embodiment. The processing in FIG. 7 is performed on each of the plurality of transmission and reception units 21.

The acquisition unit 101 acquires the object distance and the travel distance of the vehicle 1 (S101). The object distance is an object distance in each of N times (two times, as an example) of transmission and reception of ultrasonic waves by the transmission and reception unit 21. Here, in a case where the N times described above is two times, the predetermined number of times is a time of the first time, and the time subsequent to the predetermined number of times is a time of the second time.

Next, the determination unit 102 determines whether or not $\|(F1-F2)|-Y|\leq K$ is satisfied (S102). In a case where the determination unit 102 determines that $\|(F1-F2)|-Y|\leq K$ is satisfied (S102: Yes), the determination unit 102 determines that the object height is equal to or more than the transmission and reception unit height (S103). In a case where the determination unit 102 determines that $\|(F1-F2)|-Y|\leq K$ is not satisfied (S102: No), the determination unit 102 proceeds to S104.

In S104, the determination unit 102 determines whether or not $\|(D1-D2)|-Y|\leq K$ is satisfied. In a case where the determination unit 102 determines that $\|(D1-D2)|-Y|\leq K$ is satisfied (S104: Yes), the determination unit 102 determines that the object height is less than the transmission and reception unit height (S105). In a case where the determination unit 102 determines that $\|(D1-D2)|-Y|\leq K$ is not satisfied (S104: No), the determination unit 102 does not determine the object height (S106), and returns to S101.

As described above, the object detection device 11 of the present embodiment includes the acquisition unit 101 and the determination unit 102. The acquisition unit 101 acquires, a plurality of times at different predetermined timings, an object distance that is a distance from a transmission and reception unit 21 mounted on the vehicle 1 to the object O, the object distance being detected on the basis of the result of transmission of a transmission wave by the transmission and reception unit 21 and reception of a reflected wave from the object O by the transmission and reception unit 21, and acquires a travel distance of the vehicle 1 that travels while the object distances are acquired the plurality of times. The determination unit 102 determines the height of the object O on the basis of the plurality of object distances acquired by the acquisition unit 101 and the travel distance.

According to such a configuration, the height of the object O can be determined on the basis of the object distances and the travel distance, regardless of a position of the transmission and reception unit 21. Therefore, the height of the object O can be determined without impairing a degree of freedom in designing the vehicle 1.

Further, in a case where an absolute value of a difference between an absolute value of a difference between the object distance at the predetermined number of times among a plurality of times and the object distance at the time subsequent to the predetermined number of times among the plurality of times, and a travel distance of the vehicle 1 from the predetermined number of times to a time subsequent to the predetermined number of times, the travel distance being calculated on the basis of travel speed, is equal to or less than a threshold value, the determination unit 102 determines that the height of the object O is equal to or more than a height at which the transmission and reception unit 21 is attached.

According to such a configuration, for example, an object O having a height equal to or more than the height at which the transmission and reception unit 21 is attached can be detected.

Further, in a case where an absolute value of a difference between an absolute value of a difference between a length of an adjacent side R1$c$ of the right triangle R1 (first triangle) in which a length of the hypotenuse R1$a$ is an object distance at a predetermined number of times among the plurality of times and a length of an opposite side R1$b$ is a height at which the transmission and reception unit 21 is attached, and a length of an adjacent side R1$c$ of the right triangle R2 (second triangle) in which a length of the hypotenuse R2$a$ is the object distance at a time subsequent to the predetermined number of times among the plurality of times and a length of the opposite side R1$b$ is a height at which the transmission and reception unit 21 is attached, and the travel distance of the vehicle 1 from the predetermined number of times to the time subsequent to the predetermined number of times, travel distance being calculated on the basis of the travel speed, is equal to or less than a threshold value, the determination unit 102 determines that the height of the object O is less than the height at which the transmission and reception unit 21 is attached.

According to such a configuration, for example, an object O having a height less than the height at which the transmission and reception unit 21 is attached can be detected.

Further, the determination unit 102 does not determine the height of the object O in a case where an absolute value of a difference between an absolute value of a difference between a length of the adjacent side R1*c* of the right triangle R1 (first triangle) and a length of the adjacent side R1*c* of the right triangle R2 (second triangle), and the travel distance of the vehicle is equal to or greater than the threshold value.

Further, the object detection device 11 includes the plurality of transmission and reception units 21 arranged in the width direction of the vehicle 1.

According to such a configuration, for example, the height of the object O can be determined for each of the plurality of transmission and reception units 21 arranged in the width direction of the vehicle 1. Therefore, the height of the object O positioned in a relatively wide range around the vehicle 1 can be determined. Further, because the processing of determining a height of an object O can be executed for each of the plurality of transmission and reception units 21, even in a case where, for example, there is a plurality of steps as objects O at a short distance, the processing of determining the height can be performed for each step. Therefore, it is easy to reduce chances of the plurality of objects O being erroneously determined as one wall.

A program for causing a computer (for example, the processor 43 of the control unit 22, the processor 53 of the ECU 12, or the like) to execute processing for implementing various functions in the embodiment described above can be provided by being recorded in a file in an installable format or an executable format, on a computer-readable recording medium such as a compact disc (CD)-ROM, a flexible disk (FD), a CD-R (recordable), and a digital versatile disk (DVD). Further, the program may be provided or distributed via a network such as the Internet.

Note that, in the example described above, the acquisition unit 101 acquires in S101 the object distance and the travel distance of the vehicle 1 in each of the two times of transmission and reception of ultrasonic waves by the transmission and reception unit 21, but the present disclosure is not limited thereto. For example, the acquisition unit 101 may acquire in S101 the object distance and the travel distance of the vehicle 1 in each of three times or more of transmission and reception of ultrasonic waves by the transmission and reception unit 21. In this case, for example, the distance F1, the distance F2, and the travel distance of the vehicle 1 are acquired for each two consecutive times of transmission and reception of the ultrasonic waves by the transmission and reception unit 21. That is, the acquisition unit 101 acquires a plurality of distances F1, a plurality of distances F2, and a plurality of travel distances of the vehicle 1. Then, the determination unit 102 may perform the processing in and after S102 by using an average value of the plurality of distances F1, an average value of the plurality of distances F21, and an average value of the plurality of travel distances.

Here, in a case where the plurality of transmission and reception units 21 are not disposed to be shifted in the vertical direction of the vehicle 1, there is a possibility that, for an object O (for example, a blocking rod or the like installed above the road surface G at an entrance or exit of a parking lot and extending in a horizontal direction) at a position higher than a transmission and reception unit height, a reflected wave is determined to be a reflected wave from the boundary between the object O and the road surface G. In this case, by disposing the plurality of transmission and reception units 21 to be shifted in the vertical direction of the vehicle 1 and executing the above-described processing on transmission and reception by each of the transmission and reception units 21, it is possible to determine whether or not the object O is at a position higher than the transmission and reception unit height on the basis of a height position of the transmission and reception unit 21 and results of transmission and reception by the transmission and reception unit 21, and therefore, to reduce chances of the object O being erroneously determined as a step in a case where the object O is a blocking rod or the like.

The embodiment of the present disclosure have been described above, but the above-described embodiment and modifications thereof are merely examples, and are not intended to limit the scope of the disclosure. The above-described novel embodiment and modifications can be implemented in various forms, and various omissions, substitutions, and modifications may be made without departing from the gist of the disclosure. The above-described embodiment and modifications are included in the scope and gist of the disclosure.

REFERENCE SIGNS LIST

1: Vehicle, 11: Object detection device, 21, 21A to 21H: Transmission and reception unit, 101: Acquisition unit, 102: Determination unit, O: Object, R1: Right triangle (first right triangle), R2: Right triangle (second right triangle), R1*a*, R2*a*: Hypotenuse, R1*b*, R2*b*: Opposite side, and R1*c*, R2*c*: Adjacent side

The invention claimed is:

1. An object detection device comprising:
a processor and a memory storing instructions configured to implement:
an acquisition unit that acquires, a plurality of times at different predetermined timings, an object distance that is a distance from a transmission and reception unit mounted on a vehicle to an object, the object distance being detected on the basis of a result of transmission of a transmission wave by the transmission and reception unit and reception of a reflected wave from the object by the transmission and reception unit, and acquires a travel distance of the vehicle that travels while the object distances are acquired the plurality of times; and
a determination unit that determines a height of the object on the basis of a plurality of the object distances and the travel distance that are acquired by the acquisition unit, wherein,
in a case where an absolute value of a difference between an absolute value of a difference between the object distance at a predetermined number of times among the plurality of times and the object distance at a time subsequent to the predetermined number of times among the plurality of times, and the travel distance from the predetermined number of times to the time subsequent to the predetermined number of times is equal to or less than a threshold value, the determination unit determines that the height of the object is equal to or more than a height at which the transmission and reception unit is attached.

2. An object detection device comprising:

a processor and a memory storing instructions configured to implement:

an acquisition unit that acquires, a plurality of times at different predetermined timings, an object distance that is a distance from a transmission and reception unit mounted on a vehicle to an object, the object distance being detected on the basis of a result of transmission of a transmission wave by the transmission and reception unit and reception of a reflected wave from the object by the transmission and reception unit, and acquires a travel distance of the vehicle that travels while the object distances are acquired the plurality of times; and a determination unit that determines a height of the object on the basis of a plurality of the object distances and the travel distance that are acquired by the acquisition unit, wherein, in a case where an absolute value of a difference between an absolute value of a difference between a length of an adjacent side of a first right triangle in which a length of a hypotenuse is the object distance at a predetermined number of times among the plurality of times and a length of an opposite side is a height at which the transmission and reception unit is attached, and a length of an adjacent side of a second right triangle in which a length of a hypotenuse is the object distance at a time subsequent to the predetermined number of times among the plurality of times and a length of an opposite side is a height at which the transmission and reception unit is attached, and the travel distance from the predetermined number of times to the time subsequent to the predetermined number of times is equal to or less than a threshold value, the determination unit determines that the height of the object is less than the height at which the transmission and reception unit is attached.

3. The object detection device according to claim 2, wherein, in a case where an absolute value of a difference between an absolute value of a difference between a length of an adjacent side of the first right triangle and a length of an adjacent side of the second right triangle, and the travel distance is equal to or greater than a threshold value, the determination unit does not determine the height of the object.

4. The object detection device according to claim 1, further comprising a plurality of the transmission and reception units at different positions in a width direction of the vehicle.

5. An object detection method executed by an object detection device, the object detection method comprising:

a step of acquiring, a plurality of times at different predetermined timings, an object distance that is a distance from a transmission and reception unit mounted on a vehicle to an object, the object distance being detected on the basis of a result of transmission of a transmission wave by the transmission and reception unit and reception of a reflected wave from the object by the transmission and reception unit, and acquiring a travel distance of the vehicle that travels while the object distances are acquired the plurality of times; and a step of determining a height of the object on the basis of a plurality of the object distances and the travel distance acquired, wherein, in a case where an absolute value of a difference between an absolute value of a difference between the object distance at a predetermined number of times among the plurality of times and the object distance at a time subsequent to the predetermined number of times among the plurality of times, and the travel distance from the predetermined number of times to the time subsequent to the predetermined number of times is equal to or less than a threshold value, the determination unit determines that the height of the object is equal to or more than a height at which the transmission and reception unit is attached.

* * * * *